United States Patent [19]

Kaye

[11] Patent Number: 4,982,918

[45] Date of Patent: Jan. 8, 1991

[54] FORCE SENSITIVE AIRCRAFT THROTTLE WITH FEEDBACK

[75] Inventor: Arthur Kaye, Preston, England

[73] Assignee: British Aerospace Public Limited Company, London, England

[21] Appl. No.: 303,184

[22] Filed: Jan. 30, 1989

[30] Foreign Application Priority Data

Jan. 29, 1988 [GB] United Kingdom ............... 8801951

[51] Int. Cl.$^5$ .................... B64C 13/50; B64C 13/04
[52] U.S. Cl. ................................. 244/223; 244/228; 244/220; 244/221
[58] Field of Search .............. 244/220, 221, 223, 228, 244/234, 235, 236; 74/471 R, 471 XY; 73/862.05; 200/332.2, 61.39, 61.85

[56] References Cited

U.S. PATENT DOCUMENTS

| | | | |
|---|---|---|---|
| 1,528,952 | 3/1925 | Russell et al. | 244/234 |
| 2,040,839 | 5/1936 | Fator | 244/234 |
| 2,514,212 | 7/1950 | Jennings | 74/488 |
| 3,412,626 | 11/1968 | Zeigler et al. | 74/473 R |
| 3,447,766 | 6/1969 | Palfreyman | 244/236 |
| 3,585,319 | 6/1971 | Payerle et al. | 74/471 XY |
| 3,603,170 | 9/1971 | Yamazaki | 74/515 R |
| 3,786,692 | 1/1974 | Bjork | 74/512 |
| 3,839,924 | 10/1974 | Schaefer | 74/523 |
| 3,936,015 | 2/1976 | Dean | 244/234 |
| 4,212,211 | 7/1980 | Rickert | 74/538 |
| 4,441,676 | 4/1984 | Rowarth | 74/471 XY |
| 4,494,061 | 1/1985 | Kaye | 318/628 |
| 4,513,235 | 4/1985 | Acklam et al. | 318/685 |
| 4,555,960 | 12/1985 | King | 244/236 |
| 4,651,954 | 4/1987 | Miller | 244/76 R |
| 4,901,952 | 2/1990 | Curtis | 244/234 |

FOREIGN PATENT DOCUMENTS

| | | |
|---|---|---|
| 2412833 | 7/1979 | France .................... 73/862.05 |
| 292301 | 6/1928 | United Kingdom . |
| 700070 | 11/1953 | United Kingdom . |
| 779679 | 7/1957 | United Kingdom . |
| 1131581 | 10/1968 | United Kingdom . |
| 1223088 | 2/1971 | United Kingdom . |
| 1302485 | 1/1973 | United Kingdom . |
| 1398271 | 6/1975 | United Kingdom . |
| 2023076 | 12/1979 | United Kingdom . |
| 2073887 | 10/1981 | United Kingdom . |
| 2109535 | 6/1983 | United Kingdom . |
| 2118281 | 10/1983 | United Kingdom . |
| 2165927 | 4/1986 | United Kingdom . |
| 2184817 | 7/1987 | United Kingdom . |

Primary Examiner—Joseph F. Peters, Jr.
Assistant Examiner—Anne E. Bidwell
Attorney, Agent, or Firm—Cushman, Darby & Cushman

[57] ABSTRACT

A force control throttle suitable for military or civil aircraft which is stowable in a console when not required for use. Fore and aft forces applied to the throttle handle by the pilot are sensed by pressure transducers which generate, in response, signals for controlling engine thrust. Tactile information relating to engine thrust demand is fed back to the pilot by means of a drive motor which tilts the throttle handle as fore or aft pressure is exerted. The angle of tilt is a function of the degree of pressure exerted and the demanded engine thrust.

6 Claims, 10 Drawing Sheets

FORCE SENSITIVE AIRCRAFT THROTTLE WITH FEEDBACK

The present invention relates to control apparatus and devices which enable an operator to control associated apparatus to which, in use, the control apparatus or device is connected. By way of example, the control device may be a thrust demand unit (throttle box) for manual pilot or auto pilot control of the engine of an aircraft. In particular the control devices of the invention may be adapted to control the forward/idle/reverse thrust operation modes of single or multiple engined aircraft. It is to be understood however that the invention may be applied to other types of control devices.

It is common for control apparatus to include a manually moveable control member, suitable output means and final mechanical coupling to the associated apparatus to be controlled. The movement of the control member may also be controlled by means of a computer or auto pilot which movement may be manually overridden. An example of a manual override control apparatus is described in out U.K. patent application number 8008846 (8031102) corresponding to U.S. Pat. No. 4,494,061.

The output means may be a mechanical arrangement connected to follow movements of the control member and to transmit these faithfully to the final mechanical coupling to the associated apparatus under control. Alternatively the output means may comprise electrical or even optical signals transmitted by wire or fibre optic cable to a suitable electro/opto transducer controlling the final mechanical coupling. In an aircraft the use of digitally encoded signals to represent demands made by the control member and transmitted over a digital data bus provides a so-called fly-by-wire system. Similarly digitally encoded optical signals used for the same purpose in an aircraft lead to a fly-by-light system.

The invention is principally concerned with the control member of such control devices and it is to be understood that the invention could be adapted for use with any of the known automatic, with manual override, fly-by-wire or fly-by-light, systems.

In an aircraft, in certain flight conditions, for example when the pilot and aircraft are subject to high gravitational acceleration forces, movement of known control members often proves difficult if not impossible. There is a requirement to provide the pilot of an aircraft likely to experience such flight conditions with a control member which is responsive to forces exerted on the member by the pilot for example to demand different levels of thrust from the aircraft engine. Other requirements of an aircraft throttle control member include:

a) adequate sensitivity to relatively small demand changes,
b) capability of distinguishing between progressive demand changes and instantaneous maximum or minimum demands (in an aircraft throttle application such instantaneous demands are known as "slams"),
c) provision of tactile feedback to the operator to provide an indication of the level of demand,
d) safety system preventing accidental and undesired changes in demand, for example, inadvertant stopping (shut-down) of an aircraft gas turbine engine in flight,
e) provision for automatic operation in response to sensors located on the associated apparatus, for example, auto pilot control of throttle demands in an aircraft application, and,
f) for use in situations where an operator is being trained to control the associated apparatus, provision for a second operator to manually override operation of the control member. In an aircraft situation this might entail the provision of a master throttle control in a training aircraft.

In addition to the above requirements, the majority of which are essential in an aircraft throttle application, the control device should preferably include the desirable features listed below:

a) the design should not place an unacceptable workload on the operator. This is particularly important in a military aircraft application where ever increasing demands are made of pilots of modern fighter aircraft. In addition to flying the aircraft the pilot is often required to manage complex weapons, electronic countermeasures, electronic surveillance, electronic navigation, computer and communications systems.
b) the construction should be modular so that it is readily expandable should extra associated apparatus be added. In the aircraft situation a modular throttle box for a single engined aircraft could then be duplicated for a twin engined application for example.
c) the control member should take up the minimum amount of available space,
d) it should be capable of operating in a wide range of environmental conditions and with associated apparatus designed for a variety of types of operation. In the aircraft application case a throttle box should be of universal application to both civil and military aircraft, should meet standard aircraft interface requirements and should not be effected by gravitational accelleration forces.

According to the present invention control apparatus includes a control member and a means for transferring said control member from a stowed position, in which it is inoperable and of no impediment to an operator, to an operational position in which it is responsive to forces exerted thereon by the operator to control associated apparatus to which in use the control apparatus is mechanically, electrically, optically or in any other way linked.

More specifically according to the present invention there is provided control apparatus including a control member, responsive to forces exerted thereon by an operator and having a handle pivoted for rotation about an axis transverse to a direction of application of said forces.

Preferably there is further provided means for rotating the handle in response to demands on the associated apparatus so that the angular position of the handle provides an indication to the operator or the current demand on that associated apparatus.

Preferably the control member may also be controlled automatically by a system comparing desired associated apparatus activity with measured associated apparatus activity.

Preferably the control member is responsive, without movement, to progressive force application by the operator. The control member may then be a force throttle. By the term 'force throttle' we mean an engine control device including a throttle lever which is not mechanically linked to the associated apparatus ie, engine fuel control system, but is linked by a system of force sensors, sensing the attempted movement of the lever by the operator, and electrical, optical or other non-mechanical signal transmssion lines to suitable transducers and actuators for mechanically operating the engine fuel control system. Such force throttles may be extremely small compared with their fully mechanical counterparts and typically the lever may be small enough to be operated single handedly by the pilot using only his thumb and forefinger to apply demand pressure.

The force throttle may additionally be responsive with linear movement, to slams as hereinbefore defined.

The control member may be a throttle lever mounted for movement between a position in which the lever is substantially stowed within a container and an operable position in which the lever protrudes from the container.

The means for moving the lever between the stowed and operable positions may comprise an electric motor and screwjack connected to raise or lower a fulcrum of the lever so that an end of the lever remote from said fulcrum may be raised to protrude from or be lowered to be withdrawn into the container. The handle may then comprise a further elongate member rotatably located at the end of the lever remote from the fulcrum and means for rotating the handle in response to the magnitude of a demand on the associated apparatus.

The container may be a console in or forming part of the aircraft cockpit assembly. Preferably, in a fighter aircraft application the container is the pilot's left hand console.

In the above aircraft application the means for rotating the handle may comprise an electric motor mounted within or adjacent the handle and transmission means for transmitting the rotation of the electric motor to a corresponding rotation of the handle. The control device may further include sensors for providing electrical signals corresponding to the raised or lowered positions of the lever. Thus when the lever is in its stowed non-operable position the sensors may provide a zero signal or no signal at all to the associated apparatus and when the lever is in its operable position the sensors may provide lever position or force responsive signals and/or an indication to the operator that the lever is in its operable position. The sensors may comprise one or more pressure transducers fixed with respect to and responsive to movements between stowed and operable positions of and forces applied to the lever to provide signals indicative of the stowed or operable position of the lever and of the magnitude of forces applied to it.

An embodiment of the invention will now be described by way of example only and with reference to the accompanying drawings of which:

FIG. 10 is a further part of the algorithm of FIG. 9, In the following description of the embodiment shown in the drawings features common to two or more of the Figures are given identical reference numerals for ease of reference.

Figure 1:
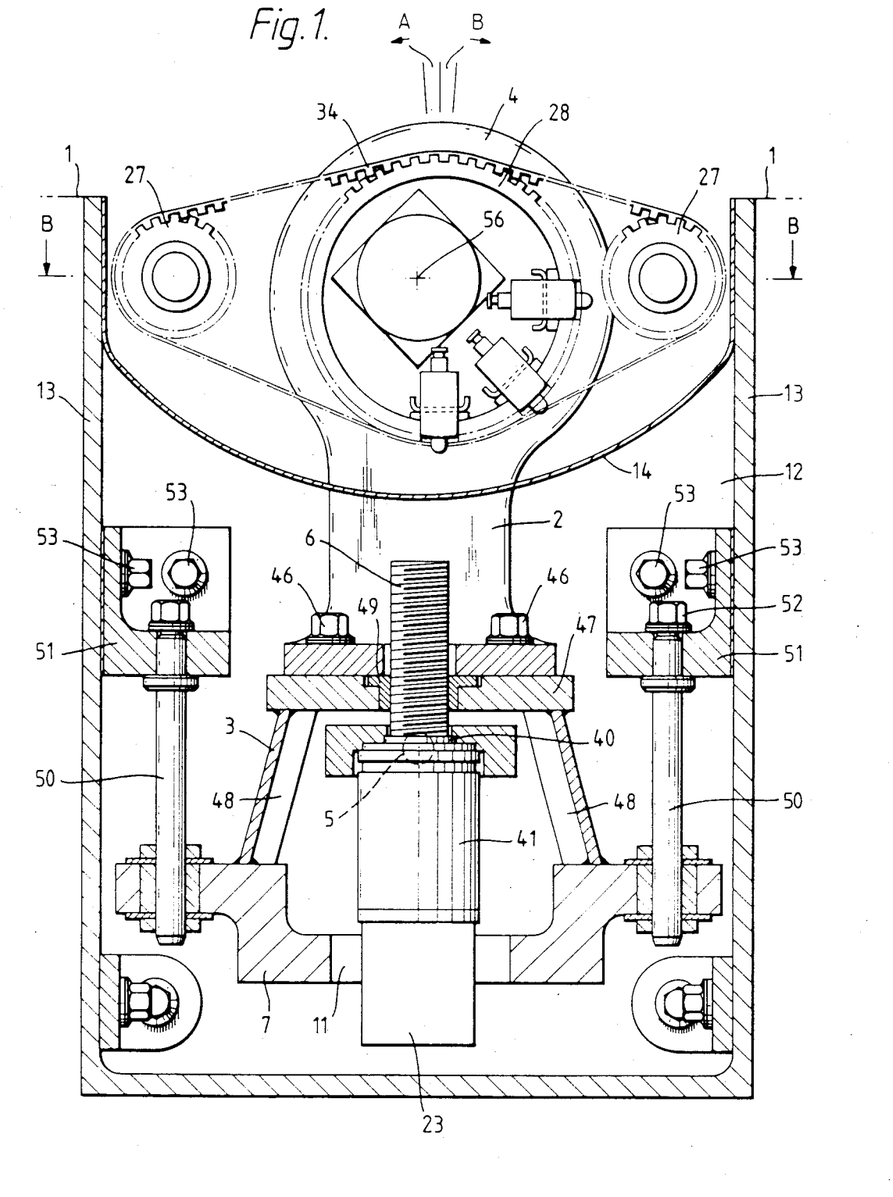
FIG. 1 is a sectional side elevation along the line A—A of FIG. 2 of a force throttle in a stowed position.

A pilots force throttle is shown in a stowed position in FIG. 1 which has been designed for fitting in an aircraft cockpit structure particularly the cockpit of a military aircraft such as a fighter aircraft. Conventionally such a force throttle will be located in a console adjacent the pilots left hand in a single engined military aircraft or in a central console in the case of fitting to a multi-engined civil aircraft. An upper external surface of the console is shown at 1. The force throttle comprises a control lever 2 secured at its lower end to a raisable support structure indicated generally at 3. The lever may be moved to a limited extent in a fore and aft direction, fore being to the left of FIG. 1 and aft being to the right of FIG. 1. The range of fore and aft movements is limited and indicated by the arrows A and B respectively and is determined by the resiliance of and various tolerances of dimensions of support structure 3.

Figure 3A:
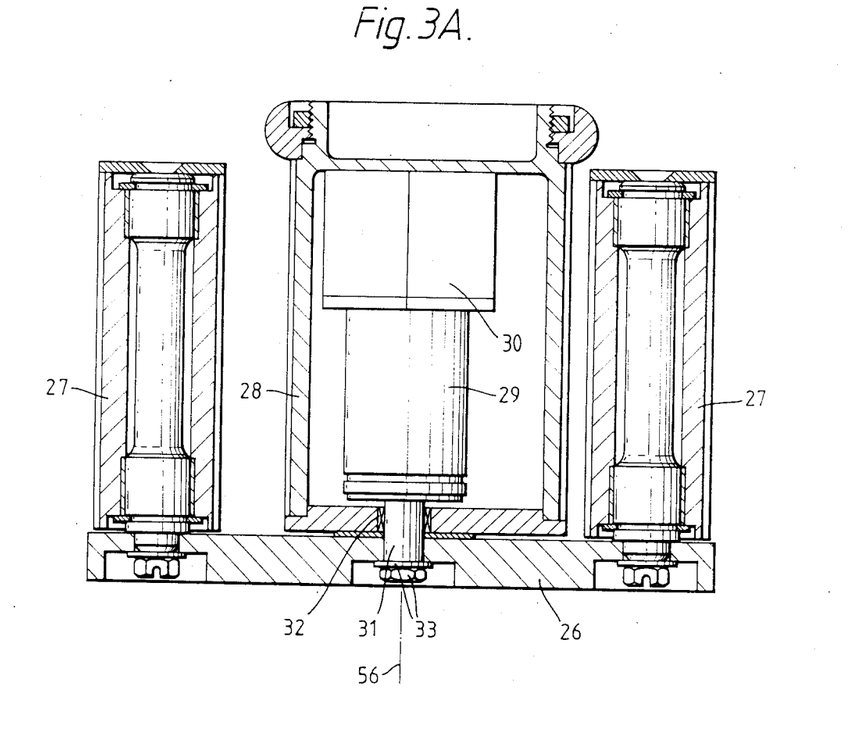
FIG. 3A is a part sectioned plan view of the drive handle of the force throttle of FIG. 1 along the line B—B thereof.

Pivoted for rotation about an axis transverse to the fore and aft direction, ie, an axis perpendicular to the plane of the paper of FIG. 1, at the top end of the lever 2 is an unusual elongated handle 4 which will be described in more detail with references to FIGS. 3A, 3B and 4 below.

The support structure carries four pedestals 8 which are adjustable in height and have heads 9 for co-operation with two pairs of pressure sensors 54 and 55, a forward pair and an aft pair. Two of the pedestals 8 are mounted ahead of the lever 2 on the structure 3 so as to direct pressure heads 9 towards the two forward mounted pressure sensors 55. The other two pedestals 8 are mounted behind the lever 2 on the structure 3 so as to direct pressure heads 9 towards the two aft mounted pressure sensors 54. In operation and with the lever 2 in its raised position attempted fore and aft movement of the lever 2 causes the structure 3 to pivot about its lower end with a corresponding raising or lowering of the pressure sensors 54 and 55.

Figure 2:
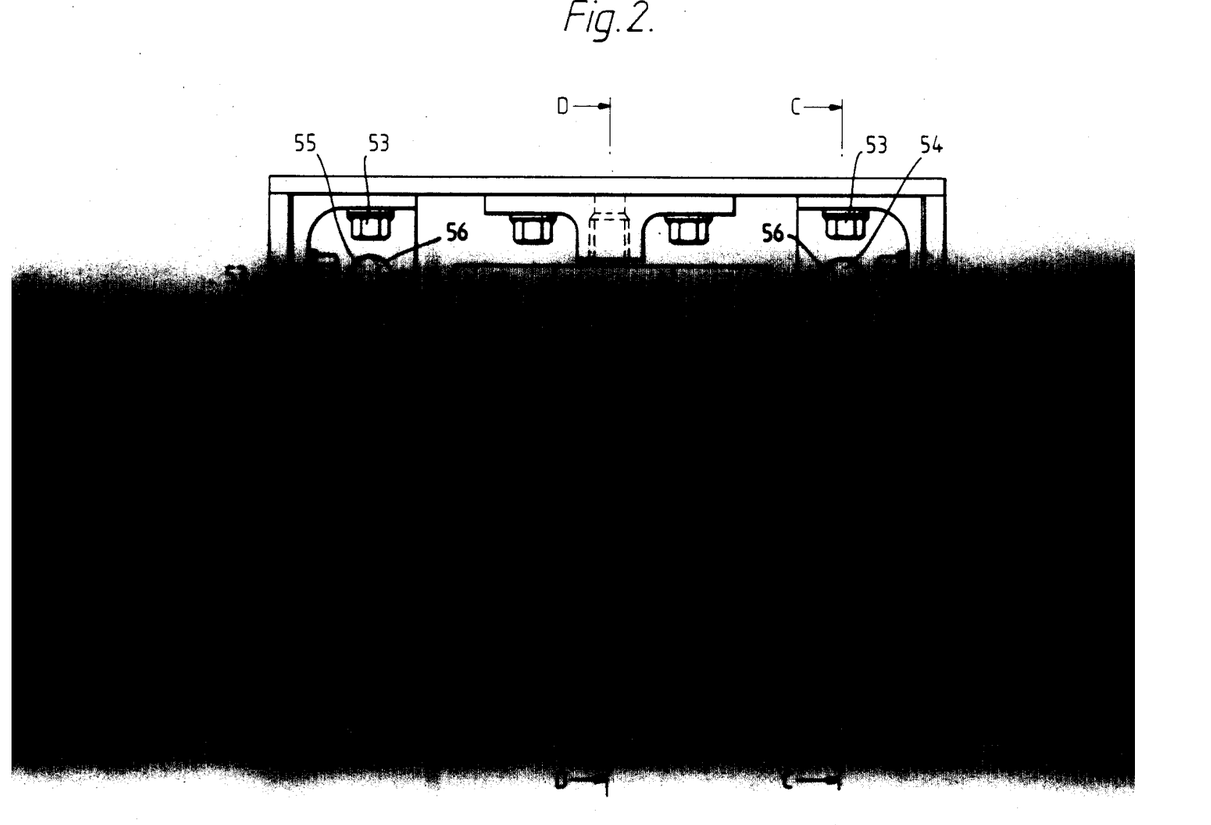
FIG. 2 is a plan view of the force throttle of FIG. 1 with the drive handle removed for clarity.

The lever 2 is generally located within recess 12 in the console 1. The recess 12 has vertical parallel walls 13 spaced apart in the fore and aft direction by a distance slightly larger than longitudinal length of the handle 4. The depth of the walls 13 also corresponds approximately to the depth of the lever 2 in a lowered position. The reason for these dimensions will become clear when the retraction of the handle and lever is described in more detail below. From the lower ends of the walls 13 is hung a generally bow shaped resilient member 14. The resilient member seals and prevents ingress of dust to a chamber below and is provided with a slot through which the lever 2 passes. The slot is dimensioned to be substantially equal in shape and area to the cross-section of the lever 2. Thus the lever 2, although not normally moved to any great extent by a progressive force applied to it, may be moved when a slam is demanded, pivotting about the lower end of lower switch 25 retracting the handle 4 into the upper surface of the console 1 as shown in FIG. 2.

Figure 7:
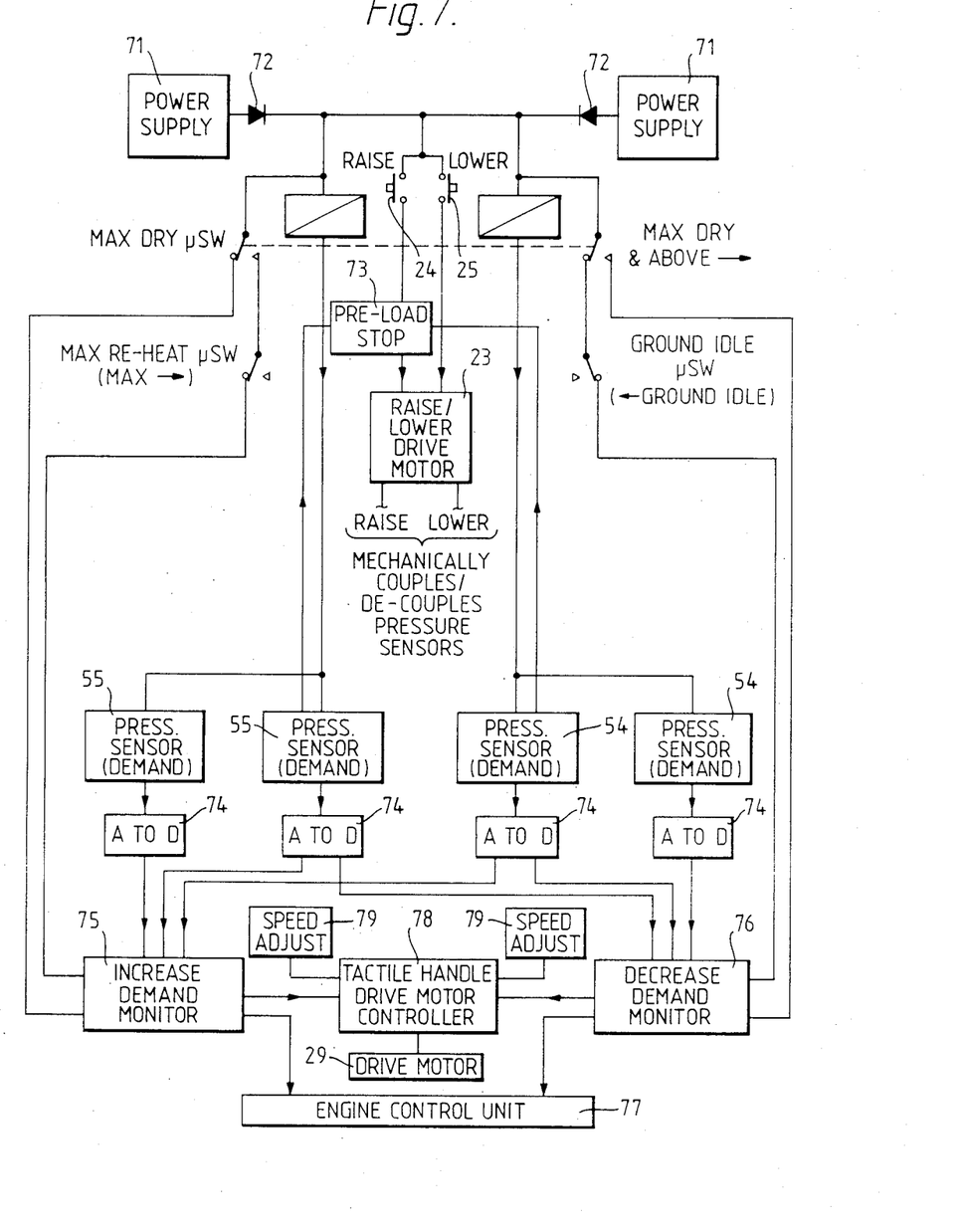
FIG. 7 is a block schematic circuit diagram of a control system associated with the force throttle shown in FIGS. 1 to 6.
Figure 8:
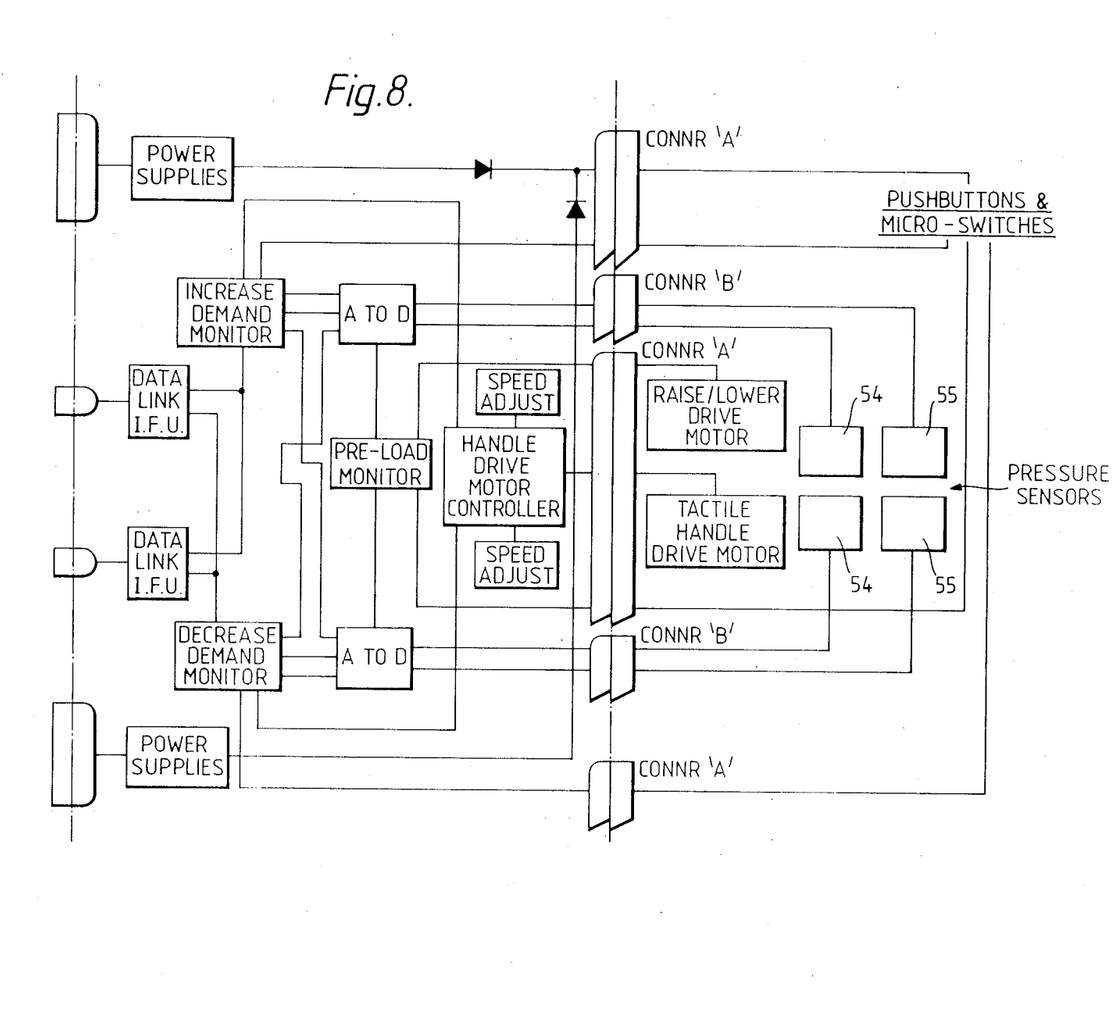
FIG. 8 is a schematic circuit diagram of an electronic control module associated with the force throttle of FIG. 1.

The electrical system will now be briefly described with reference to FIG. 7. The system comprises two power supply units 71 connected to the supply DC power to pressure sensors 54 and 55 and via diodes 72 and raise and lower switches 24 and 25 to the raise/lower drive motor 23. An output from each of two of the sensors 54 and 55 is connected to a pre-load stop circuit 73, which may be in the form of a simple comparator to switch off the raising action of the raise/lower drive motor 23 whenever the sensors 54 and 55 reach a predetermined pre-load. Outputs from the sensors 54 and 55 are fed by signal conditioning circuits 74 to increase/decrease demand monitor circuits 75 and 76. Outputs of the circuits 75 and 76 are connected to an appropriate engine control unit 77 which may include a digital data bus carrying appropriate demand signals to an electro-mechanical transducer operating the throttle mechanism at the engine (not shown). Further outputs of the circuits 75 and 76 are connected to the drive motor 29 via a handle drive motor controller circuit 78. The controller 78 is provided with speed adjustment circuits 79 so that the rate of rotation of the handle in response to thrust demand changes by the pilot can be optimised to provide appropriate demand indications and 'feel'. It will be appreciated that the circuits 75, 76 and 78 may take the form of micro-processor circuits.

Figure 9:
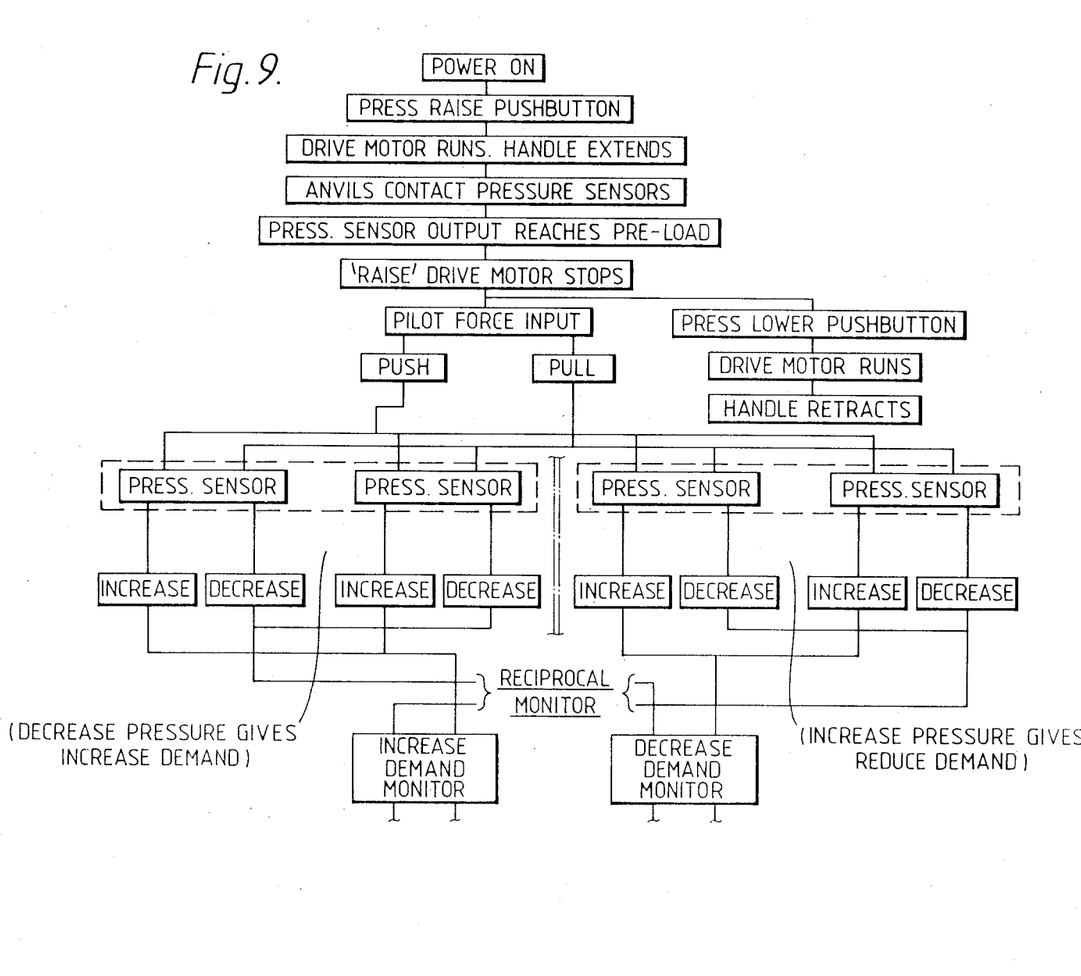
FIG. 9 is a part of an operational flow diagram, or algorithm, relating to the force throttle of FIG. 1.
Figure 10:
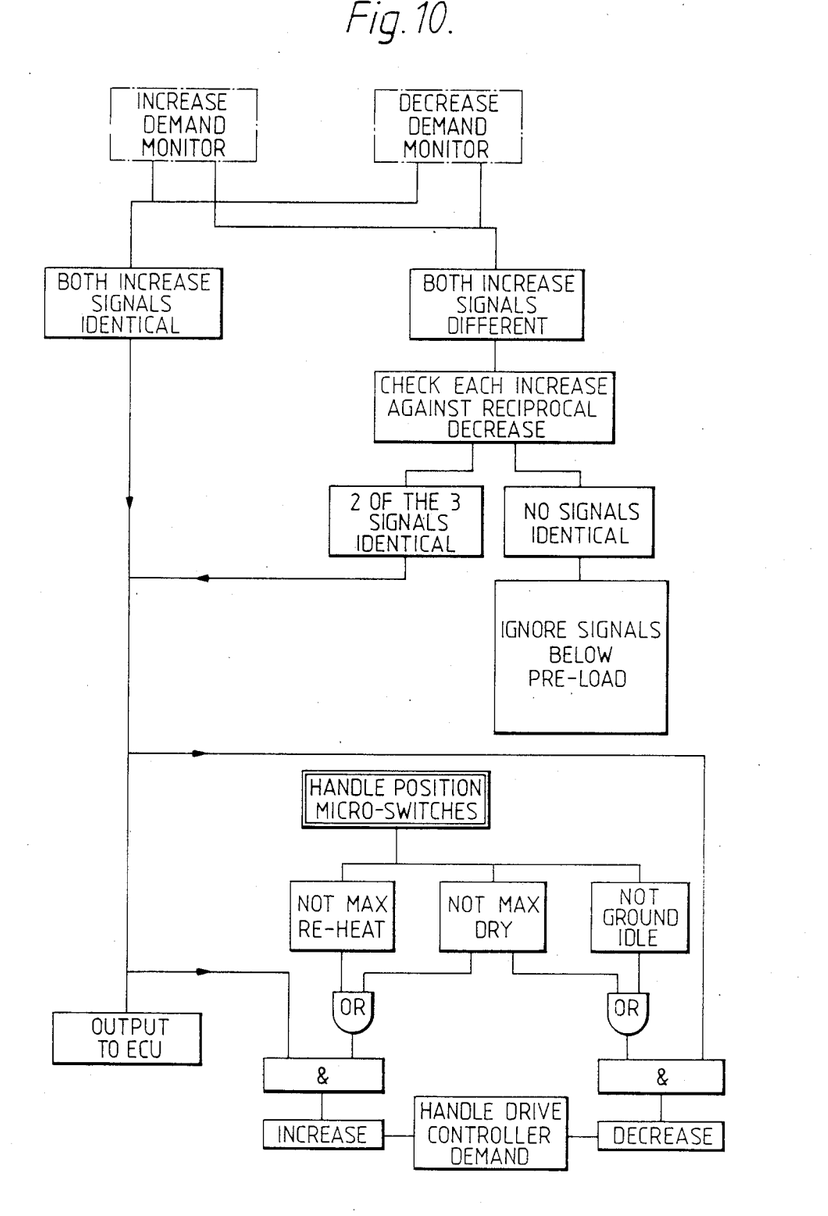

In operation the algorithm of which may be followed in FIGS. 9 and 10, thrust modulation demands in the form of pilots push or pull inputs on the handle 4 cause corresponding pressure changes detected by the pressure sensors 54 and 55. With the handle in the raised position all of the sensors will be pre-loaded as determined by the pre-load circuit 73. Movement of the handle 4 will thus cause an increase in pressure sensed by two of the sensors 54 and 55 and a decrease in pressure sensed by the other two sensors 54 and 55. Each demand monitor 75, 76 receives three inputs from the signal conditioning circuits 74, two signals for an increase in pressure and one of a decrease in pressure. The latter signal is used as a comparison to determine the accuracy of the other two signals. The demand monitors have voting logic which provides an appropriate modulation commend signal to the engine control unit and at the same time outputs a drive commend to the handle drive motor 29 via the drive motor controller 78. A pilot demand of sufficiently high pressure will cause the handle 4 to move to the position C2 D2 shown in FIG. 4. When the pilot has finished with the engines the force stick will be returned to the DI - DI position. THe pilot then selects the lower switch 25 and the drive motor 23 will lower the handle to its recess position shown in FIG. 1 and all power to the engine will be removed.

Many modifications and improvements to the above embodiment will now suggest themselves to those skilled in the art and the invention is by no means limited in scope to the embodiment shown. It will also be appreciated that such a control lever may have applications other than to the control of gas turbine engines in an aircraft application.

The electronics of FIG. 7 may be an electronic control module located conveniently below the lever 2 in the console 1, say at 52 in FIG. 7.

I claim:

1. Control apparatus, comprising:
    a lever adapted to receive force exerted thereon without moving in response to said force,
    a system of force sensors for sensing attempted movement of the lever and for generating control signals indicative thereof to control an associated apparatus or system,
    a handle rotatably located at an end of the lever,
    means for rotating the handle to predetermined angular positions in response to a magnitude of a demand by said received force, on the associated apparatus or system, and
    means for moving said lever from an inoperable position in which the lever is stowed and said handle does not protrude from the container to an operative position in which the handle does protrude from the container.

2. A force control throttle comprising:
    a handle assembly, including a handle mounted on a control lever in a way to receive forces exerted thereon without moving in response to said exerted forces, said control lever being secured to a support structure, said support structure being mounted within a container,
    force transducers mounted on internal walls of said container, said force transducers generating electrical signals in response to said forces exerted on said handle, and
    a motor for producing rotation of said handle about said control lever in response and proportion to electrical signals from said force transducers to provide feedback about an amount of said forces.

3. A force control throttle as claimed in claim 2 further including means for transferring said control lever between a stowed position in which it is inoperable and of no impediment to an operator, and a position in which it is operable.

4. A force control throttle as claimed in claim 3 and further including safety means to prevent an operator from using said handle to generate electrical signals in response to forces exerted on said handle when said control lever is in a stowed position.

5. A force control throttle as claimed in claim 4 and wherein said safety means comprises an electrical switching device.

6. Control apparatus as claimed in claim 2 and wherein the container forms part of an aircraft cockpit and said electrical signals are linked to an aircraft engine control unit.

* * * * * structure 3, the slot in the member 14 permitting such movement.

When the lever 2, and the support structure 3, are in the lowered position there is no contact between the pressure sensors and heads 9. When the lever 2 and support structure 3 are in the raised, operational position all four pressure sensors 54 and 55 are arranged, by suitable adjustment to their heights relative to the structure 3, to be in contact with heads 9.

Normally, when the pilot applies a progressive force to the lever 2 in its raised position via the handle 4 no actual movement occurs. However, the pilot input force will increase the force on two of the pressure (55) sensors and reduce the force on the other sensor pair (54). During a slam demand, as the lever 2 is moved in a fore and aft direction about the lower end of the structure 3, thus raising or lowering the pressure sensors 54 and 55 as described above, one pair of sensors will be responsive to the increased pressure of contact with heads 9.

When with the lever 2 raised a slam is first applied and the lever 2 has been momentarily moved to its maximum aft position (arrow B in FIG. 1) the aft mounted pressure sensors 54 will therefore transmit electrical signals corresponding to a maximum increase in pressure whilst the forward mounted pressure sensors 55 will transmit electrical signals corresponding to a maximum decrease in pressure.

The structure 3 is gimbal mounted at 5 on a jacking member of a screwjack mechanism 40. The handle support column or lever 2 carried by the jacking member may be driven by a raise/lower drive motor 23 via a gearbox 41 to raised or lowered positions. The handle support column 2 is bolted at 46 to a platform 47 having legs 48 attached to an anvil 7. The anvil 7 is provided with a clearance bore 11 to permit it to pass over the motor 23 and gearbox 41 as it is raised or lowered. The anvil 7 is slidable mounted on two cylindrical shafts 50 which are secured by nuts 52 to brackets 51 so as to hang vertically down therefrom. The brackets 51 are in turn secured to the container walls 13 by means of nuts and bolts 53. The pressure transducers 54 and 55 referred to above are located in bores 56 on the underside of brackets 51.

The platform 47 has a central internally threaded hollow column 49 co-operating with the screwjack mechanism 40.

Figure 5:
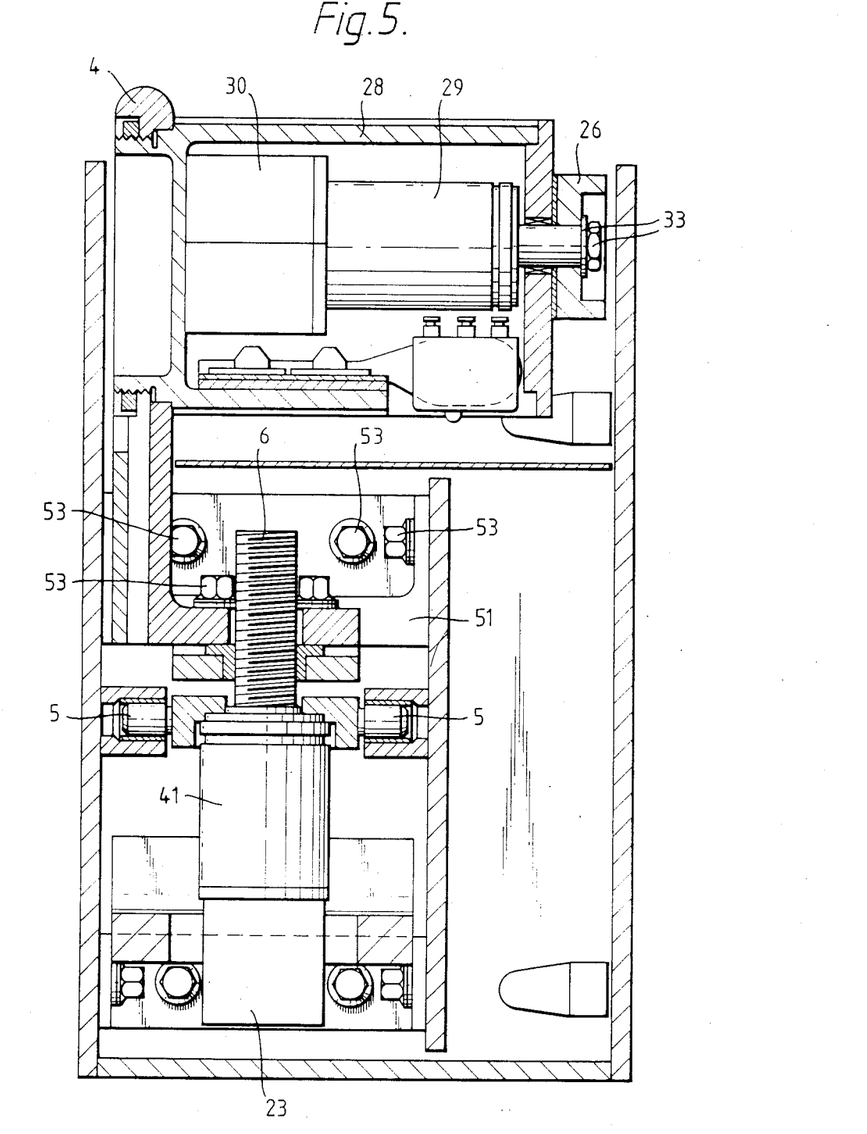
FIG. 5 is a sectional side elevation of the force throttle of FIG. 2 along the line D—D thereof.
Figure 6:
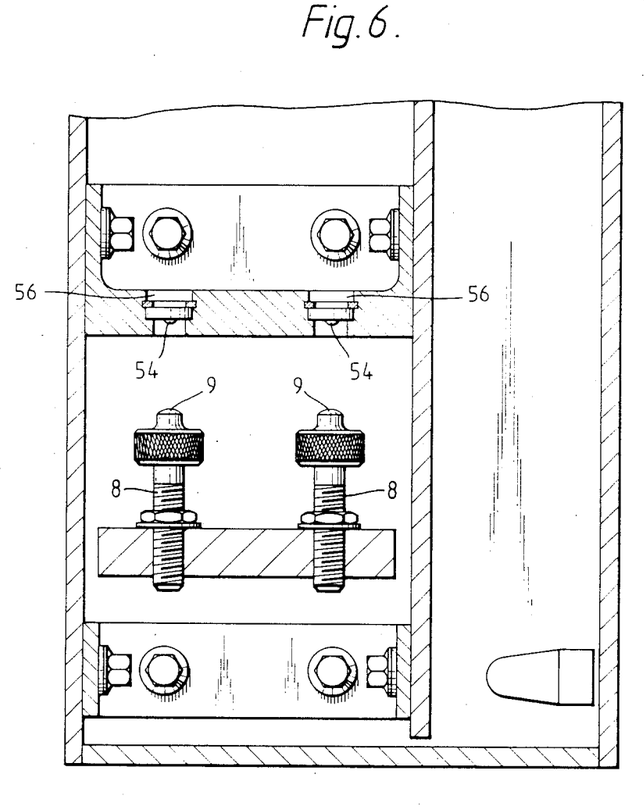
FIG. 6 is a sectional side elevation of the force throttle of FIG. 2 along the line C—C thereof.

When the anvil 7, platform 47 and support column are raised by the jacking mechanism 40 the lever 2 will be in a high, raised position in which the handle 4 protrudes above the surface of the console 1 and may be fully operated by the pilot about the gimbal 3. However when the anvil 7, platform 47 and support column are lowered to the position as shown in FIG. 2, the handle 4 is fully retracted into the console 1 so that its upper surface forms almost a continuous surface with the surface 1. Operation of the raise/lower drive motor 23 is controlled by raise and lower push-button electrical switches 24 and 25 (see FIG. 5) which will be conveniently mounted in the upper surface of the console 1.

When the force stick is in the lowered position as shown in FIG. 1 the engine will be completely shutdown and the force stick inoperable to control engine speed. However inadvertant engine shutdown is not possible when the lever 2 is in the operable position unless a deliberate selection of the lower push-button 25 is made.

The handle 4 of the force stick is of a special design to provide the pilot with tactile information regarding the engine control demand he has selected. The handle 4 is of generally ellipsoidal shape in cross-section as shown in FIGS. 1 and 4. The reason for this will become clear.

Figure 3B:
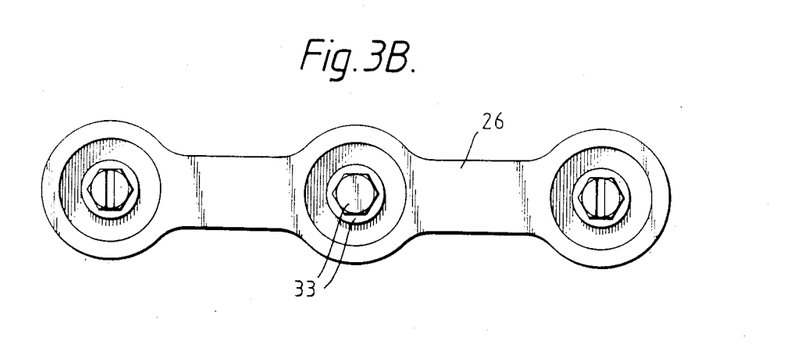
FIG. 3B is a side view of a carriage plate of the drive handle shown in FIG. 3A below it.

The handle 4 consists of three cylindrical sleeves mounted on bearings in and elongate carriage member 26 (see FIG. 3B). Two of the sleeves 27 are mounted for rotation with respect to the centre of the carriage member 26 at the extremities thereof and are freely rotating rollers with square sectioned machined teeth in their outer periphery. The third sleeve 28, which has a diameter greater than the two equi-diametered sleeves 27 also has square sectioned machined teeth but is fixed to the control member 2.

The sleeve 28 is asymmetrically disposed between the two outer sleeves 27 but houses within it a handle drive motor 29 and epicyclic gearbox 30 having a drive shalft 31 carried in a bearing 32 which extends through the sleeve 28 adjacent the centre of carriage member 26 to which it is attached by means of nut and washer 33. Thus in operation the motor 29 is able to rotate the carriage member 26 eccentrically and the sleeves 27 about the sleeve 28.

Tightly wound around all three sleeves (27, 28) is a belt 34 having a toothed inner surface engaging with the machined teeth of the sleeves. The carriage member 26 is pivoted at 56 about the upper transverse axis of the lever 2. Rotation of the drive motor 29 will result in an anti-clockwise rotation of the carriage means 26 at a slower rate dependent on the ratio of the gearbox 30. It will thus be appreciated that rotation of the drive motor 29 will raise the fore end and lower the aft end of the handle 4 or vice versa depending on its direction of rotation. The drive motor 29 is driven in an appropriate direction in response to fore and aft movements of the lever 2 and corresponding pressure signals from the pressure sensors 54 and 54 as will be described in more detail with reference to FIG. 7. Thus for example with the force throttle in the raised operable position a forward push on the handle 4 by the pilot (left to right on the unit depicted in FIG. 1) will cause the drive motor 29 to rotate driving the gearbox 30 causing a clockwise rotation of the carriage means 26 and, in turn, the handle 4 raising the aft-end and lowering the fore-end of the handle 4 giving the pilot a sense of 'feel' to the thrust demand.

Figure 4:
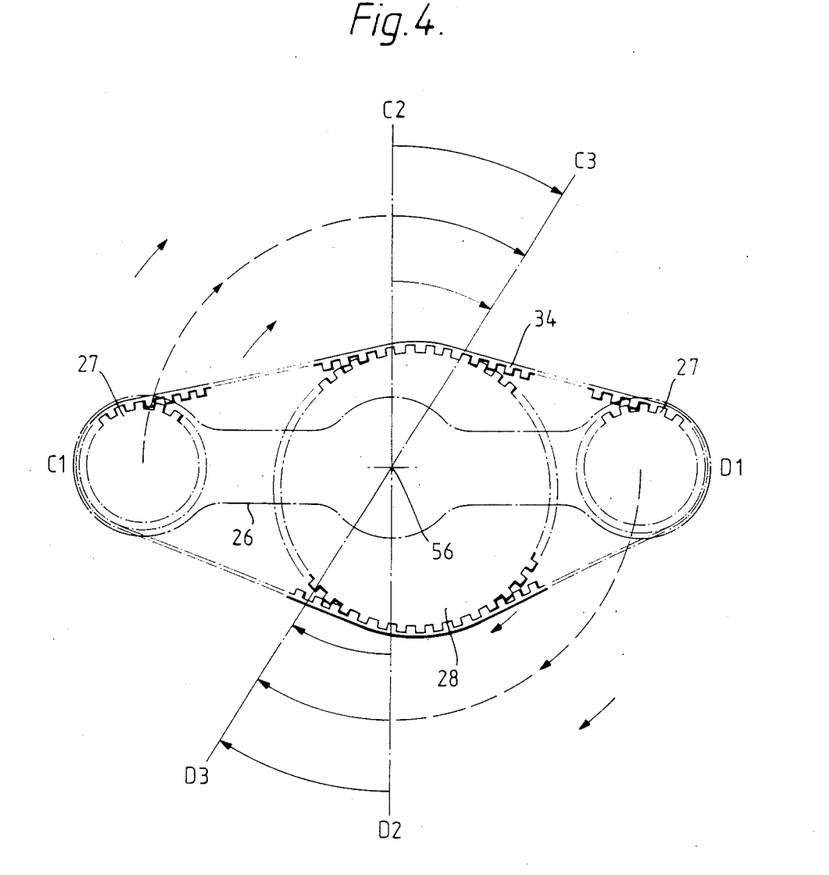
FIG. 4 is a sectioned side elevation of the handle shown in FIG. 3 to illustrate various angular positions of the handle.

In FIG. 4 three positions of the handle 4 are shown. In the horizontal position ie, with the longitudinal axis of the carriage members 26 in the position C1-D1 and with the lever 2 in the raised position the force lever is active and ready for engine start. When the longitudinal axis of the carriage member has been raised to the vertical position, C2-D2, in response to an increase in thrust demanded by the pilot pushing the handle forward, maximum dry thrust has been demanded of the engine. In the overcentre position C3-D3 maximum reheat has been demanded by the pilot.

When the pilot wishes to reduce thrust, for example, from the C3 D3 or C2 D2 positions he will pull back on the handle 4 causing the gearbox output shaft to rotate and imparting an anti-clockwise rotation of the carriage means 26 raising the fore-end of the handle 4 and lowering the aft-end and giving the pilot a sensation of resistance to his reducing thrust demand.

At dispersal when the engine is ready to be switched off the carriage means 26 will be horizontal, C1-D1 and the force lever ready for shutdown. The pilot selects the